Figure 1:
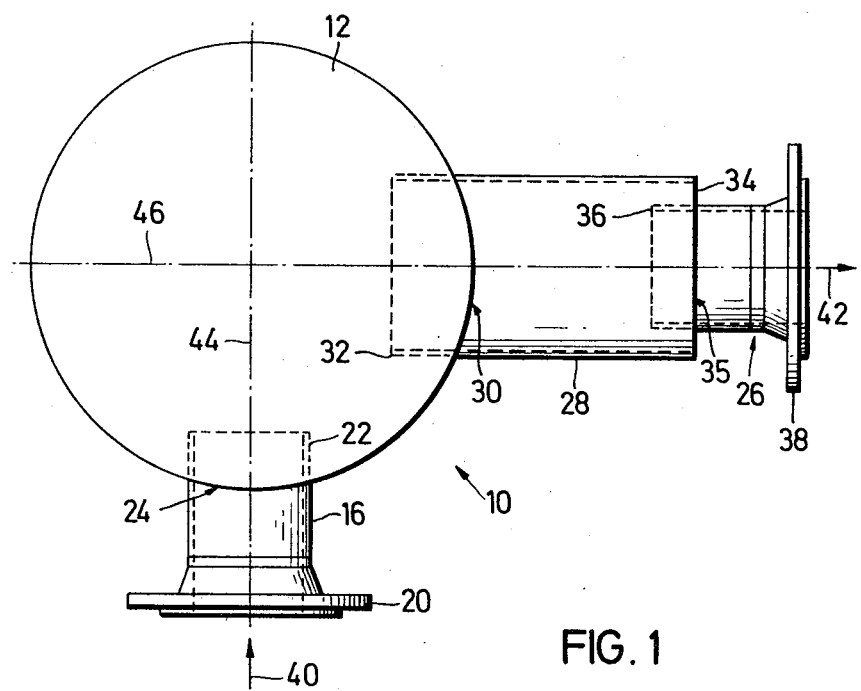

United States Patent [19]
Westenberg

[11] 3,722,544
[45] Mar. 27, 1973

[54] PNEUMATIC CONVEYING SYSTEM
[76] Inventor: Martin Westenberg, Klosterstrasse 34, Frechen, Germany
[22] Filed: Apr. 7, 1971
[21] Appl. No.: 131,921

[30] Foreign Application Priority Data

May 5, 1970 Germany......................P 20 21 847.7

[52] U.S. Cl. ..................137/608, 285/179, 285/192, 302/28, 302/64
[51] Int. Cl..............................................F16k 21/00
[58] Field of Search .137/608; 285/179, 192; 302/27, 302/28, 30, 64

[56] References Cited

UNITED STATES PATENTS

| | | | |
|---|---|---|---|
| 2,564,683 | 8/1951 | Frisch | 302/28 |
| 2,587,170 | 2/1952 | Klingler et al. | 285/179 X |
| 2,911,235 | 11/1959 | Stumbough | 285/179 X |
| 1,786,969 | 12/1930 | Van Der Huel | 302/28 UX |

FOREIGN PATENTS OR APPLICATIONS

| | | | |
|---|---|---|---|
| 687,239 | 5/1964 | Canada | 302/64 |

Primary Examiner—Robert G. Nilson
Attorney—Michael S. Striker

[57] ABSTRACT

A pneumatic conveying system has a receptacle provided with at least two apertures having inclined axes. A first tubular element is seal-tightly mounted in one of the apertures and a portion — which may be of one piece with or separate from the remainder of said first tubular element — surrounds the aperture in the interior of the receptacle. A second tubular element is also seal-tightly mounted in the other of these apertures. It includes one tubular member of a larger diameter and an inner end portion of which — of one piece with or separate from the remainder of the one tubular member — surrounds the aperture in the interior of the receptacle, whereas the outer end portion of this one tubular member has a transverse wall provided with an opening. Another tubular member of a smaller diameter has an inner end portion — again either of one piece with or separate from the remainder from the other tubular member — which interiorly surrounds the opening in the transverse wall.

6 Claims, 2 Drawing Figures

PNEUMATIC CONVEYING SYSTEM

BACKGROUND OF THE INVENTION

The present invention relates generally to pneumatic conveying systems, and more particularly to an improved pneumatic conveying system.

Still more particularly, the present invention relates to a flow-changing or direction changing arrangement in a pneumatic conveying system.

The use of pneumatic conveying systems for conveying of pulverulent, granular or particulate materials by the propulsive force of a stream of gas is widespread. Thus, systems of this type are utilized for loading and unloading various transporting vehicles, such as land-based vehicles, water-based vehicles, and the like. However, conveying systems of this type also have other applications, for instance, for the conveyance of materials of the type mentioned above between different stations of an industrial installation, between using stations and storage or supply locations, and in other applications.

The material which is transported by a stream of gas, usually air, within the tubular conduits of such a system has a decidedly abrasive effect on the walls of the tubular conduits, and the extent of such abrasive effect depends upon the characteristics of the material being conveyed. In any case, however, the experience with conveying systems of this type has shown that after a comparatively brief period of operation the walls of the tubular conduits are so weakened at certain points of the system, that they will break. Evidently, when this occurs it is necessary to repair or replace the conduit thus damaged. Not surprisingly, the abrasive effect is most significant — and destruction in the walls requiring repair or replacement takes place most frequently — at those points where the stream of gas carrying the suspended material therein is caused to change its direction of flow, that is at elbows or bends. Quite clearly, this is undesirable not only because of the expenses involved in supplying replacement parts and in the labor required for installing them, but also in terms of the downtime during which the system cannot operate.

These problems are not new and attempts have been made to overcome them. The art knows a construction utilizing a receptacle provided with inlet and outlet apertures with which the inlet and outlet conduits communicate, with the axes of the inlet and outlet apertures (and therefore of the inlet and outlet conduits) being inclined with reference to one another to such an extent as is required to change the direction of flow in the intended sense. Both the inlet and outlet apertures are surrounded at the interior of the receptacle with annular collar-like projections. The purpose of these projections is to cause in operation of the system the deposition of a layer of the conveyed material on the interior wall of the receptacle, with this layer preventing abrasion of the wall of the receptacle by the material which is suspended in the flowing gas stream. This is achieved in that these annular projections surrounding the respective apertures cause quiet zones in the otherwise turbulent interior of the receptacle, so that some of the material carried along in the gas stream can become deposited in these quiet zones on the interior of the receptacle wall, forming the desired layer thereon. Material which passes through the receptacle subsequent to the formation of such a layer — formation takes place rapidly upon initiation of operation of the system — thus can no longer contact the wall of the receptacle and be deflected thereby to change its direction of flow, but instead will contact the deposited layer of particles, so that the wall is protected against abrasion.

However, while this prior-art construction provides good protection for the receptacle against damage due to abrasion, it has been found that the stream of particles entrained in the flowing gas stream does not enter the outlet conduits — that is the conduit or conduits receiving the stream from the receptacle — in parallelism with the axes of the outlet conduit. Instead it has been determined that when the stream enters the outlet conduit or conduits, it does so under an acute angle with this axis and will assume an orientation in parallelism with this axis only after having traversed a certain distance within the outlet. The inevitable result of this initial inclination of the flow direction of the stream with reference to the axis of the outlet conduit is that the stream will initially impinge against one portion of the wall of the outlet conduit from which it is then reflected back towards the axis, whereupon it will soon orient itself so as to flow in parallelism with this axis. This impingement upon the wall of the outlet conduit, however, causes abrasion of this wall so that the wall portion where the impingement takes place will rapidly be disintegrated. In other words, what the aforementioned prior-art construction has in effect achieved is to change the locus at which abrasion will occur, from the bend — i.e., of the receptacle — into the actual outlet conduit. This change does not, however, eliminate or even diminish the undesirable difficulties which arise from such abrasion and which have been enumerated earlier.

SUMMARY OF THE INVENTION

It is, accordingly, an object of the present invention to overcome the difficulties of the prior art.

More particularly, it is an object of the present invention to provide an improved pneumatic conveying system herein these difficulties are avoided.

Still more particularly, it is an object of the present invention to provide such an improved pneumatic conveying system wherein not only the component within which the actual change of flow direction occurs is protected against abrasion, but wherein also the outlet conduit or conduits of the system will be similarly protected.

In pursuance of the above objects, and of others which will become apparent hereafter, one feature of the invention resides in a pneumatic conveying system which, briefly stated, comprises a receptacle having at least two apertures whose axes are inclined with reference to each other. A first tubular element extends seal-tightly into one of these apertures and has an outer end portion adapted to receive a particle-carrying gas stream, and an inner end portion which surrounds this one aperture in the interior of the receptacle. According to the invention the system further comprises a second tubular element including one tubular member of a first diameter extending seal-tightly into the other of the apertures and having an interior end portion surrounding the other aperture in the interior of the receptacle being adapted to receive the particle-carrying gas stream. An exterior end portion of one tubular member is provided with a transverse wall having an opening and an other tubular member of a smaller second diameter extends seal-tightly into this opening and has an upstream end portion which surrounds the opening in the interior of the one tubular member, and a remote downstream end portion.

In this manner I assure the development of a protective layer of the particles carried by the gas stream not only within the receptacle but also within the second tubular element, so that the undesired abrasion of the wall of the second tubular element is avoided.

The inner end portion of the first tubular element may be a discrete part, or it may be of one-piece with the remainder of the first tubular element, and the same is true of the interior end portion of the one tubular member of the second tubular element, and of the upstream end portion of the other tubular member of the second tubular element.

With the construction according to the present invention the particles carried in the gas stream cannot contact and abrade the walls of the second tubular element once the protective layer of such particles has formed, which will take place very rapidly upon initiation of operation of the system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a diagrammatic and very simplified plan view of one embodiment of the invention; and FIG. 2 is a view similar to FIG. 1 but illustrating another embodiment of the invention.

DESCRIPTION OF THE PREFERRED EMBODIMENTS

Discussing firstly the embodiment illustrated in FIG. 1, it is pointed out that for purposes of simplicity I have chosen to explain the invention by way of a particularly uncomplicated direction-changing arrangement in a pneumatic conveying system. In this embodiment, the flow direction of a stream of gas carrying suspended particles therein is to be changed through 90°, that is the incoming stream 40 moving along the path 44 is to be deflected so as to move along the path 46 which extends at right angles to the path 44 and to leave as the outgoing stream 42. It is emphasized, however, that there is no reason why the change in direction has to be at a 90° angle, inasmuch as quite obviously the angle can be greater or lesser. It is also not necessary that the axes of the incoming and outgoing conduits — which in FIG. 1 are coincident with the paths 44 and 46, respectively — be located in a common plane as shown in FIG. 1; they could be located in different planes.

Keeping this in mind it is pointed out that the construction according to the present invention is generally identified with reference numeral 10. It comprises a receptacle 12 which in the illustrated embodiment is configurated as a hollow cylinder, the opposite axial ends of which are closed with non-illustrated, preferably domed covers. One or both of these covers or an additional cover (also not illustrated) provided in a suitable aperture may be made removable to afford access to the interior of the receptacle 12 for cleaning and maintenance purposes.

In the illustrated embodiment of FIG. 1 the receptacle 12 is provided with an inlet aperture 24 and an outlet aperture 30. An inlet conduit 16 is seal-tightly mounted in the aperture 24 and in FIG. 1 the inner end portion 22 of the conduit 16 extends inwardly beyond the aperture 24 and forms therearound an annular collar. The outer end portion of the conduit 16 is provided with a flange 20 by means of which it may be connected with a suitable supply conduit (not illustrated) through which a stream of particle-carrying gas is introduced in the direction of the arrow 40 into the inlet conduit 16. The conduit 16 is connected with the receptacle 12 in suitable manner, for instance by means of a welded seam. However, other ways of establishing a seal-tight connection may also be utilized, and it will also be appreciated that in place of a flanged connection utilizing the flange 20, the supply conduit could also be connected with the inlet conduit 16 in other manner, for instance by a welded connection.

The supply conduit 16 constitutes a first tubular element and a removal conduit constituting a second tubular element is composed of two tubular members 26 and 28. The actual removal conduit is the tubular member 26 which in the prior art would extend through the aperture 30 into the interior of the receptacle 12, in the same manner in which the supply conduit 16 extends into the interior of the receptacle. This has the disadvantages which were outlined above.

According to the present invention these disadvantages are avoided in that the tubular element 26 does not directly communicate with the interior of the receptacle 12, but instead communicates therewith via the intermediary of a tubular member 28. The latter has a diameter which is greater than the diameter of the tubular member 26, but of course smaller than the diameter of the receptacle 12, as is indeed the case with the diameter of the supply or inlet conduit 16.

The tubular member 28 is seal-tightly connected with the receptacle 12 so as to communicate with the aperture 30 therein, again is suitable manner as by means of a welded connection.

The interior endportion 32 projects inwardly beyond the wall of the receptacle 12 and surrounds the aperture 30 in the illustrated manner. The interior end-portion 32 may be of one piece with the remainder of the tubular member 28, which is currently preferred because this is by far the simplest and least expensive construction. But it could also be a separate tubular portion which would be connected in suitable manner — e.g., by welding — with the inner side of the wall of the receptacle 12. The same is true of the inner endportion 22 of the inlet conduit 16.

The outer endportion of the tubular member 28 is provided with a transverse wall 34 having an opening 35 therein. With this opening 35 it communicates with the tubular member 26 whose diameter is smaller than that of the tubular member 28, as FIG. 1 clearly shows. Again, the upstream endportion 36 of the tubular member 26 extends inwardly and beyond the opening 35 in which the tubular member 26 is seal-tightly mounted by means of a welded connection. The upstream endportion 36 may be of one piece with the remainder of the tubular member 26, or it may be a discrete tubular or annular collar component which is mounted on the inner side of the wall 34 in a suitable manner. As in the case of supply conduit 16 the tubular member 26 is also provided with a flange 38 which may be connected to a removal conduit into which the deflected stream enters from the tubular member 26 and in the direction of the arrow 42, or the flange 38 may be omitted and some different connection, with the non-illustrated removal conduit may be effected, as by welding or the like.

As the particle carrying-stream passes through the inner conduit 16 and thereupon past the portion 22 and into the receptacle 12, it is deflected through 90° to enter into the outlet conduit composed of the tubular members 26 and 28 and travels through the same in the direction of the arrow 42. The presence of endportions 22 and 32 ensures that a protective layer of the conveyed particles will become deposited on the inner surface of the receptacle 12, very rapidly after the operation of the system begins, whereby direct contact of subsequently conveyed particles in the gas stream with the wall of the receptacle 12 is prevented, thereby avoiding the danger of abrasion and eventual destruction of this wall.

However, although it has been indicated that the particle-carrying gas stream is deflected through 90°, the initial deflection is not at right angles to the path 44 and into the path 46; instead the stream is arcuately deflected about the point of intersection of the paths 44 and 46 and, as it enters the outlet conduit through the aperture 30, it does so at an acute angle with reference to path 46 which is coincident with the longitudinal axis of the outlet conduit and of the aperture 30. Only after travelling some distance in the outlet conduit does the particle-carrying stream finally orient itself to a condition of parallelism with the path 46. As a result, its initial flow at an acute angle with reference to path 46 and therefore the axes of the outlet conduit, the gas stream upon entering the outlet conduit will initially contact a portion of the wall of the outlet conduit, in FIG. 1 the portion in which the stream is directed downwardly because of the flow speed of the particle-carrying stream, the prior-art constructions did not permit the development of a protective layer — similar to that which forms in the interior of the receptacle 12 — within the outlet conduit. The result was the eventual destruction of the wall of the outlet conduit in the area of impingement due to abrasion.

However, the present invention avoids this difficulty due to the presence of the tubular member 28. The length in axial direction of the tubular member 28 corresponds to that distance which the particle-carrying gas stream requires before it will orient itself to flow in parallelism with path 46, after entering the outlet conduit. Due to the fact that the tubular member 28 has an internal diameter which is greater than that of the tubular member 26, and that a collar-shaped projection 36 is provided about the opening 35, the invention assures that a protective layer of the particulate material will develop everywhere on the inner surface of the tubular member 28 (as identified by the broken lines) despite the fact that initially upon entering the tubular member 28 the particle-carrying gas stream is flowing at an acute angle to the path 46. Thus, the particles in the gas stream will impinge — once the protective layer has been formed, which takes place rapidly upon start-up of the system — not on the wall of the tubular member 28 but instead on the protective layer, thus being prevented from abrading the wall of the tubular member 28. By the time the particle-carrying gas stream reaches the opening 35 and enters into the tubular member 26, it has already assumed an orientation parallel with the path 46 and thereby with the axis of the tubular members 28 and 26, so that do to the frictional retardation of the stream on the inner surface of the tubular member 26, a further protective layer of particles — identified again by broken lines — will form on the inner surface of the tubular member 26 and will thus protect the latter also against abrasion. Of course, these protective layers are stationary or near stationary in all instances.

Figure 2:
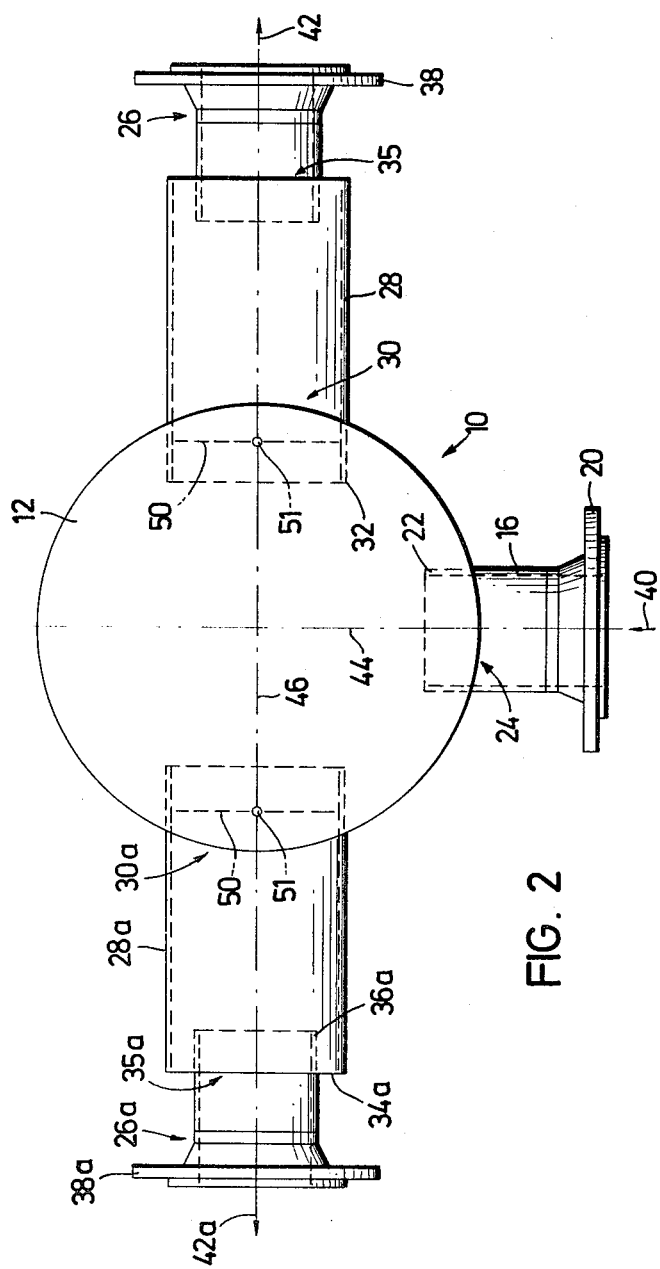

It will be appreciated that the present invention is not limited to the embodiment illustrated in FIG. 1, where a change in the flow direction of the particle-carrying gas stream is desired as the exclusive aim of the construction. Not only is it possible to change the flow direction through angles greater or lesser than 90° as pointed out before, but it is also possible to utilize the present invention in constructions in which the particle-carrying gas stream is to be selectively channelled into various different outlet conduits. Such an embodiment is for instance diagrammatically illustrated in FIG. 2. It will be seen that in FIG. 2 those components identical with the components of FIG. 1 are identified with like reference numerals. In addition, however, FIG. 2 has a further outlet aperture 30a in the receptacle 12, and a further second tubular element having the tubular members 26a and 28a, communicates with the outlet aperture 30a in the same manner in which the second tubular element composed of members 26 and 28 communicates with the outlet opening 30. Insofar as the components and elements of this second tubular element are the same as those of the first-mentioned tubular element, they have the same reference numerals followed by the suffix a. In the embodiment of FIG. 2, it is desired that it be possible to deflect the incoming particle-carrying gas stream at will either into the right-hand or into the left-hand outlet conduit. For this purpose, the outlet conduits are each provided with a valve 50 here illustrated as a butterfly-valve pivotable about a pivot axis 51. Such valves can be controlled for movement between open and closed positions in known manner, which is not a part of the present invention, and of course, they can be replaced by other closure means, such as slide-valves or the like. Depending upon which of the valves is closed, the particle-carrying gas stream will be deflected into the outlet conduit, the valve of which is open. The operation and the advantages of the construction in FIG. 2 are the same, as in the embodiment of FIG. 1, that is the undesirable abrasion effect is avoided in the same manner.

Of course, in the embodiment of FIG. 2 the axes of the two (or more) outlet conduits need not extend at right angles to the axis of the inlet conduit, but could extend at different angles with reference thereto and also with reference to one another, and also the axes of the three or more conduits could be located in different planes instead of being located in a common plane as illustrated in FIG. 2.

It will be understood that each of the elements described above, or two or more together, may also find a useful application in other types of constructions differing from the types described above.

While the invention has been illustrated and described as embodied in a pneumatic conveying system, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a pneumatic conveying system for abrasive materials, in combination, a receptacle having an internal dimension and at least two apertures whose axes are inclined with reference to each other; a first tubular element extending seal-tightly into one of said apertures and having a first internal diameter smaller than said internal dimension, an outer end portion adapted to receive a particle-carrying gas stream, and an inner end portion extending through said one aperture into the interior of said receptacle; and a second tubular element, comprising one tubular member of a second internal diameter which is also smaller than said internal dimension, said one tubular member extending seal-tightly into the other of said apertures and having an interior end portion located in the interior of said receptacle and adapted to receive said particle-carrying gas stream, and an exterior end portion provided with a transverse wall having an opening, said second tubular element further comprising an other tubular member of a third diameter smaller than said second diameter and extending seal-tightly into said opening and having an upstream end portion located in the interior of said one tubular member, and a remote downstream end portion.

2. In a pneumatic conveying system as defined in claim 1, wherein said inner endportion is of one piece with the remainder of said first tubular member.

3. In a pneumatic conveying system as defied in claim 1, wherein said upstream endportion is of one piece with the remainder of said other tubular member.

4. In a pneumatic conveying system as defined in claim 1, wherein said receptacle is of cylindrical configuration.

5. In a pneumatic conveying system as defined in claim 1, said outer endportion and said downstream endportion each having a flange adapted to be connected to a supply conduit and to a removal conduit, respectively.

6. In a pneumatic conveying system as defined in claim 1, said receptacle having an additional aperture whose axis is inclined with reference to the axis of said one aperture; further comprising an additional tubular element similar to said second tubular element and seal-tightly connected with said additional aperture; and means for selectively blocking and unblocking the interior endportions of said second tubular element and said additional tubular element, respectively.

* * * * *